US012754491B2

(12) United States Patent
Sasaki

(10) Patent No.: US 12,754,491 B2
(45) Date of Patent: Oct. 6, 2026

(54) CARRIER CORE MATERIAL AND ELECTROPHOTOGRAPHIC DEVELOPMENT CARRIER USING SAME AND ELECTROPHOTOGRAPHIC DEVELOPER

(71) Applicants: DOWA ELECTRONICS MATERIALS CO., LTD., Tokyo (JP); DOWA IP CREATION CO., LTD., Okayama (JP)

(72) Inventor: Shinya Sasaki, Okayama (JP)

(73) Assignees: DOWA ELECTRONICS MATERIALS CO., LTD., Tokyo (JP); DOWA IP CREATION CO., LTD., Okayama (JP)

( * ) Notice: Subject to any disclaimer, the term of this patent is extended or adjusted under 35 U.S.C. 154(b) by 486 days.

(21) Appl. No.: 18/287,111

(22) PCT Filed: Apr. 19, 2022

(86) PCT No.: PCT/JP2022/018107
§ 371 (c)(1),
(2) Date: Oct. 16, 2023

(87) PCT Pub. No.: WO2022/244573
PCT Pub. Date: Nov. 24, 2022

(65) Prior Publication Data

US 2024/0201612 A1 Jun. 20, 2024

(30) Foreign Application Priority Data

May 20, 2021 (JP) ................................ 2021-085066

(51) Int. Cl.
*G03G 9/107* (2006.01)
*G03G 15/08* (2006.01)

(52) U.S. Cl.
CPC ........... *G03G 9/108* (2020.08); *G03G 9/1075* (2013.01); *G03G 15/0865* (2013.01)

(58) Field of Classification Search
CPC ..... G03G 9/108; G03G 9/1085; G03G 9/1132
See application file for complete search history.

(56) References Cited

U.S. PATENT DOCUMENTS 8,865,386 B2 10/2014 Kawauchi et al.
2015/0220014 A1 8/2015 Kawauchi et al.
2016/0306301 A1* 10/2016 Sugahara .............. G03G 9/108

FOREIGN PATENT DOCUMENTS

EP 1445656 * 8/2004 .............. G03G 9/10
EP 2 555 056 B1 1/2017

(Continued)

OTHER PUBLICATIONS

Translation of WO 2018/181845.*

(Continued)

*Primary Examiner* — Peter L Vajda
(74) *Attorney, Agent, or Firm* — Oliff PLC

(57) ABSTRACT

A carrier core material includes ferrite particles, contains CaSiO3, and has a true density at least equal to 3.5 g/cm3 and at most equal to 4.5 g/cm3. A particle strength index calculated from formula (1) is preferably at most equal to 1.5% by volume. (1): Particle strength index=V2−V1 (In the formula, V1: cumulative value (% by volume) of particle size 22 μm or less in cumulative particle size distribution of carrier core material before crushing test, and V2: cumulative value (% by volume) of particle size 22 μm or less in cumulative particle size distribution of carrier core material after crushing test) Crushing test conditions: 30 g of carrier core material crushed using a sample mill for 60 seconds at a rotational speed of 14000 rpm.

8 Claims, 6 Drawing Sheets

(56) References Cited

FOREIGN PATENT DOCUMENTS

| | | | | | |
|---|---|---|---|---|---|
| EP | 3686677 | | * | 7/2020 | G03G 9/083 |
| JP | 2009-086093 | A | | 4/2009 | |
| JP | 2016-170224 | A | | 9/2016 | |
| WO | 2014/033875 | A1 | | 3/2014 | |
| WO | WO 2018/181845 | | * | 10/2018 | G03G 9/107 |

OTHER PUBLICATIONS

Jun. 21, 2022 International Search Report issued in International Patent Application No. PCT/JP2022/018107.

Apr. 23, 2025 extended Search Report issued in European Patent Application No. 22804487.1.

* cited by examiner

CARRIER CORE MATERIAL AND ELECTROPHOTOGRAPHIC DEVELOPMENT CARRIER USING SAME AND ELECTROPHOTOGRAPHIC DEVELOPER

TECHNICAL FIELD

The present invention relates to a carrier core material and an electrophotographic development carrier using such a carrier core material and an electrophotographic developer.

BACKGROUND ART

For example, in an image forming apparatus using an electrophotographic system such as a facsimile, a printer or a copying machine, a toner is adhered to an electrostatic latent image formed on the surface of a photosensitive member to visualize it, the visualized image is transferred to a sheet or the like and thereafter the visualized image is fixed by being heated and pressurized. In terms of achieving high image quality and colorization, as a developer, a so-called two-component developer containing a carrier and a toner is widely used.

In a development system using a two-component developer, a carrier and a toner are agitated and mixed within a development device, and the toner is charged by friction so as to have a predetermined amount. Then, the developer is supplied to a rotating development roller, a magnetic brush is formed on the development roller and the toner is electrically moved to a photosensitive member through the magnetic brush to visualize an electrostatic latent image on the photosensitive member. The carrier after the movement of the toner is separated from the top of the development roller, and is mixed again with the toner within the development device.

In recent years, in order to save power by reducing agitation power in a development device and to stabilize image quality by suppressing "toner spent" in which components of a toner are adhered to the surface of a carrier, it has been proposed to provide voids within a carrier core material and to further fill the voids therewithin with a resin so as to reduce the mass of the carrier core material (Patent Documents 1 and 2 and the like).

However, in the carrier core material within which the voids are provided, its apparent density is lowered but the strength of the core material is lowered. Hence, when stress is applied to the carrier core material for a long period of time due to long-term use, the carrier core material may crack or chip. When the carrier core material cracks or chips, dielectric breakdown may occur from the cross section of the exposed carrier core material having low insulation, with the result that a failure (white spots in an image) may occur in which white spots are generated in a sheet transfer image.

As a method for reducing the apparent density of the carrier core material to enhance the particle strength thereof, there may also be a method for adding, as a raw material component of the carrier core material, $SiO_2$ (silicon dioxide) which has a lower true density than ferrite which is a main component of the carrier core material.

However, since $SiO_2$ easily absorbs moisture, practical problems are expected such as a decrease in the charging characteristic of the carrier core material in a high-temperature, high-humidity environment.

RELATED ART DOCUMENT

Patent Document

Patent Document 1: Japanese Unexamined Patent Application Publication No. 2016-170224
Patent Document 2: Japanese Unexamined Patent Application Publication No. 2009-086093

DISCLOSURE OF THE INVENTION

Problems to be Solved by the Invention

Hence, the present invention is made in view of the conventional problems described above, and an object thereof is to provide a carrier core material in which toner spent is unlikely to occur and which has high particle strength.

Means for Solving the Problem

In order to achieve the object described above, a carrier core material according to the present invention is a carrier core material formed of ferrite particles, the carrier core material includes $CaSiO_3$ (calcium silicate) and a true density is equal to or greater than 3.5 g/cm$^3$ and equal to or less than 4.5 g/cm$^3$.

In the carrier core material described above, a particle strength index calculated from a formula (1) below is preferably equal to or less than 1.5% by volume:

$$\text{particle strength index} = V2 - V1 \tag{1}$$

(in the formula, V1 is a cumulative value (% by volume) with a particle diameter of 22 μm or less in a total particle size distribution of the carrier core material before a crush test, and V2 is a cumulative value (% by volume) with a particle diameter of 22 μm or less in a total particle size distribution of the carrier core material after the crush test) and conditions of the crush test are that 30 g of the carrier core material is crushed using a sample mill at a rotation speed of 14000 rpm for 60 seconds.

In the carrier core material described above, the apparent density of the ferrite particles is preferably equal to or greater than 1.7 g/cm$^3$ and equal to or less than 2.1 g/cm$^3$. A specific measuring method and specific measurement conditions will be described in Examples later.

In the carrier core material described above, the saturation magnetization of the ferrite particles is preferably equal to or greater than 40 Am$^2$/kg and equal to or less than 72 Am$^2$/kg. A specific measuring method and specific measurement conditions will be described in Examples later.

Preferably, in the carrier core material described above, the residual magnetization of the ferrite particles is equal to or less than 2.5 Am$^2$/kg, and the coercive force thereof is equal to or less than 30 oersteds ($30\times10^3/(4\pi)$ A/m). A specific measuring method and specific measurement conditions will be described in Examples later.

In the carrier core material described above, the content of $CaSiO_3$ in the ferrite particles is preferably equal to or greater than 10% by mass and equal to or less than 50% by mass.

Preferably, in the carrier core material described above, the ferrite particles include a material represented by a composition formula $(Mn_xFe_{3-x})O_4$ (where $0 \le X < 3$), the content of Ca is equal to or greater than 3.4% by mass and equal to or less than 15.8% by mass and the content of Si is equal to or greater than 3.0% by mass and equal to or less than 11.4% by mass.

According to the present invention, there is also provided an electrophotographic development carrier in which the surface of any one of the carrier core materials described above is coated with a resin.

According to the present invention, there is further provided an electrophotographic developer including: the electrophotographic development carrier described above; and a toner.

In the present specification, each of the "ferrite particles", the "carrier core material", the "electrophotographic development carrier" and the "toner" means an aggregate of particles (powder). Unless otherwise specified, "to" indicated in the present specification is used to include values before and after the "to" as a lower limit value and an upper limit value.

Advantages of the Invention

According to the carrier core material of the present invention, toner spent is suppressed. The carrier core material is unlikely to crack or chip even in long-term use.

According to the electrophotographic development carrier and the electrophotographic developer of the present invention, the generation of white spots in an image is suppressed, with the result that images of satisfactory image quality can be obtained stably over a long period of time.

DESCRIPTION OF EMBODIMENTS

Figure 1:
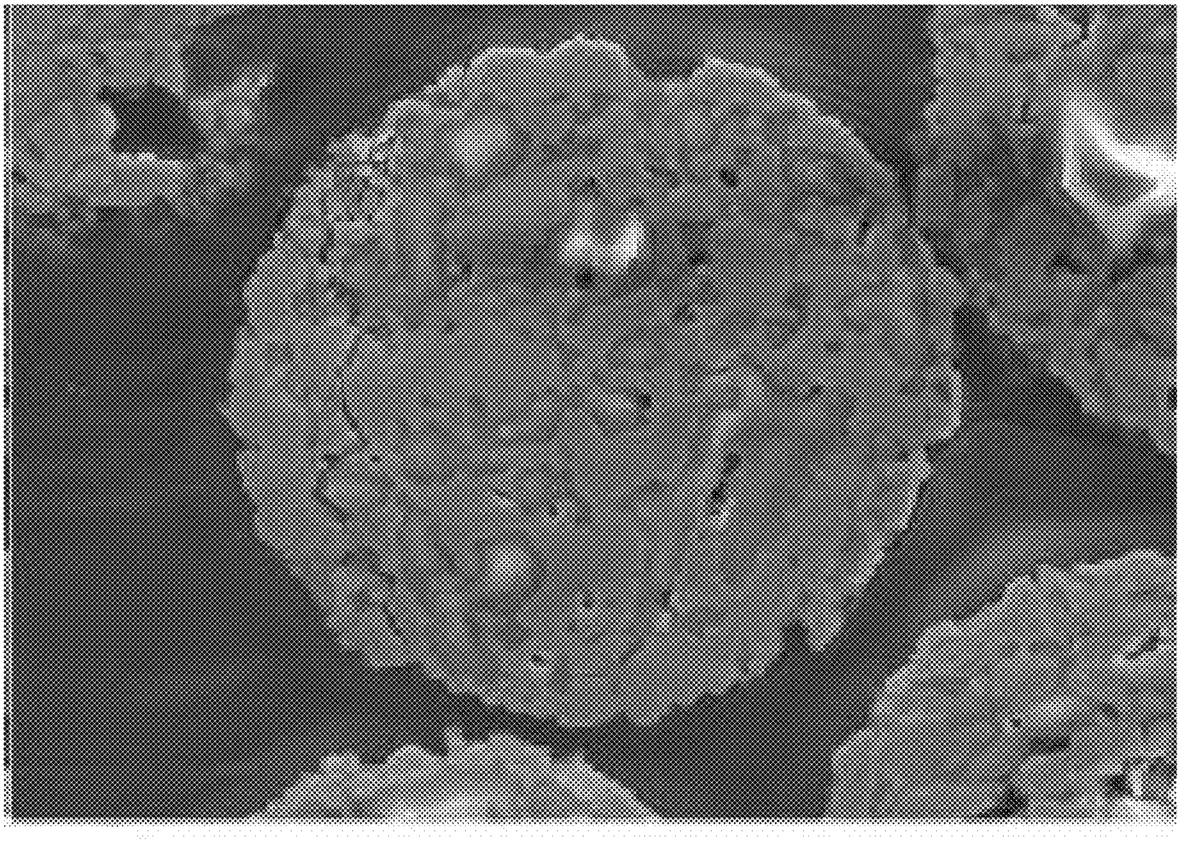
FIG. 1 is a cross-sectional SEM photograph of a carrier core material in Example 1.
Figure 2:
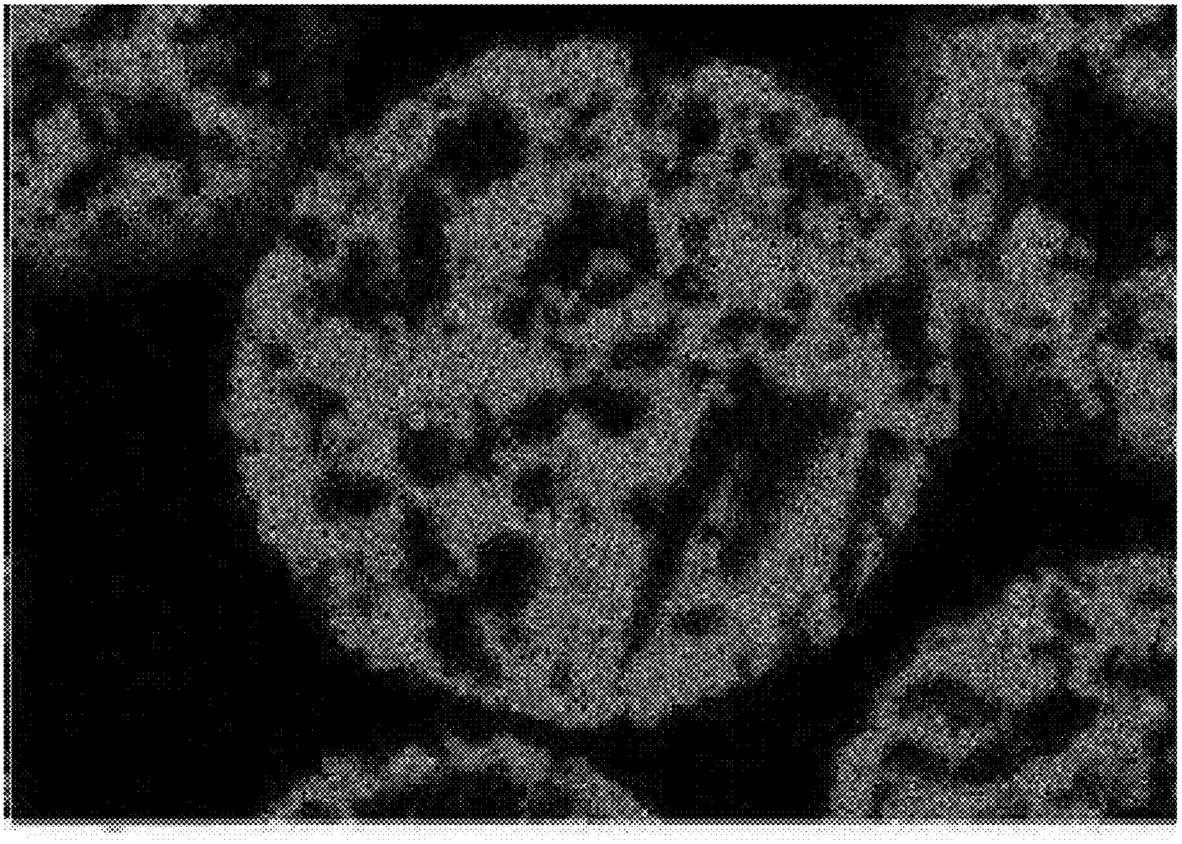
FIG. 2 is an EDS elemental (Fe) mapping in the cross-sectional SEM photograph of FIG. 1.
Figure 3:
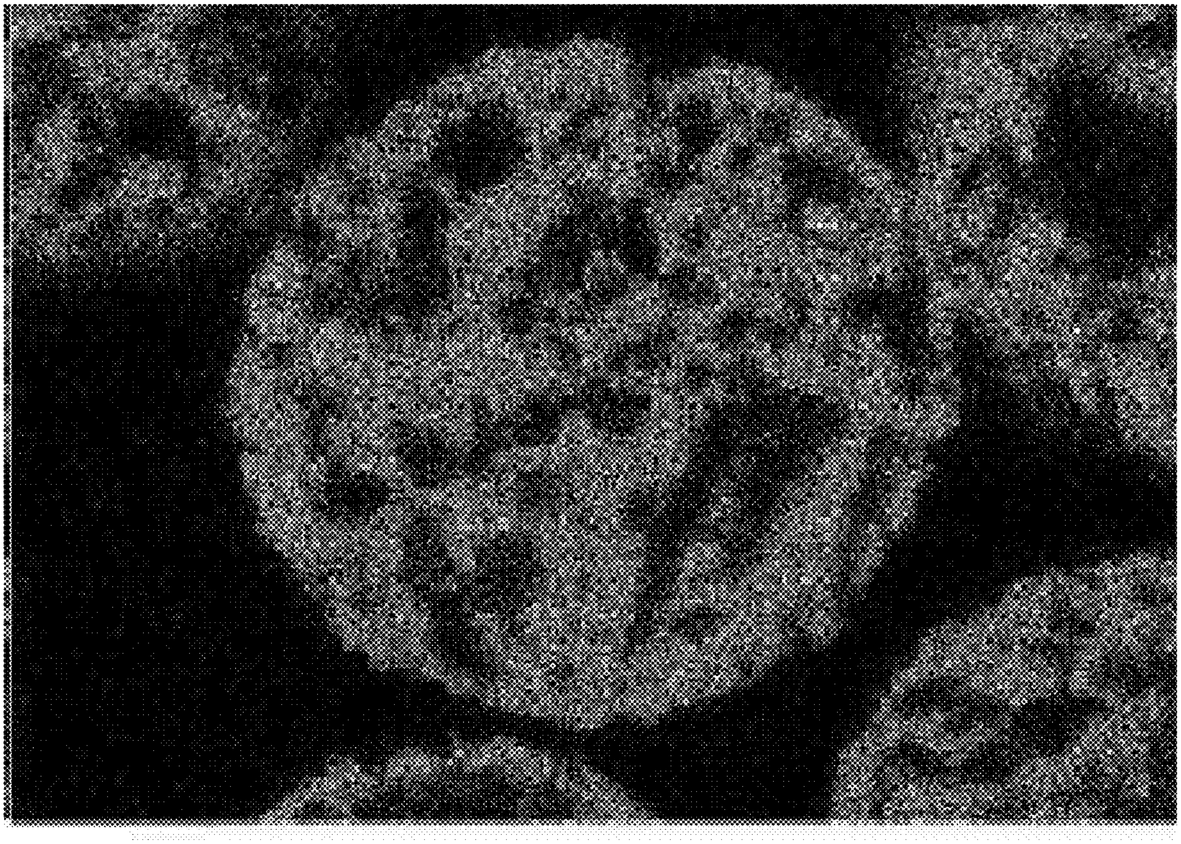
FIG. 3 is an EDS elemental (Mn) mapping in the cross-sectional SEM photograph of FIG. 1.
Figure 4:
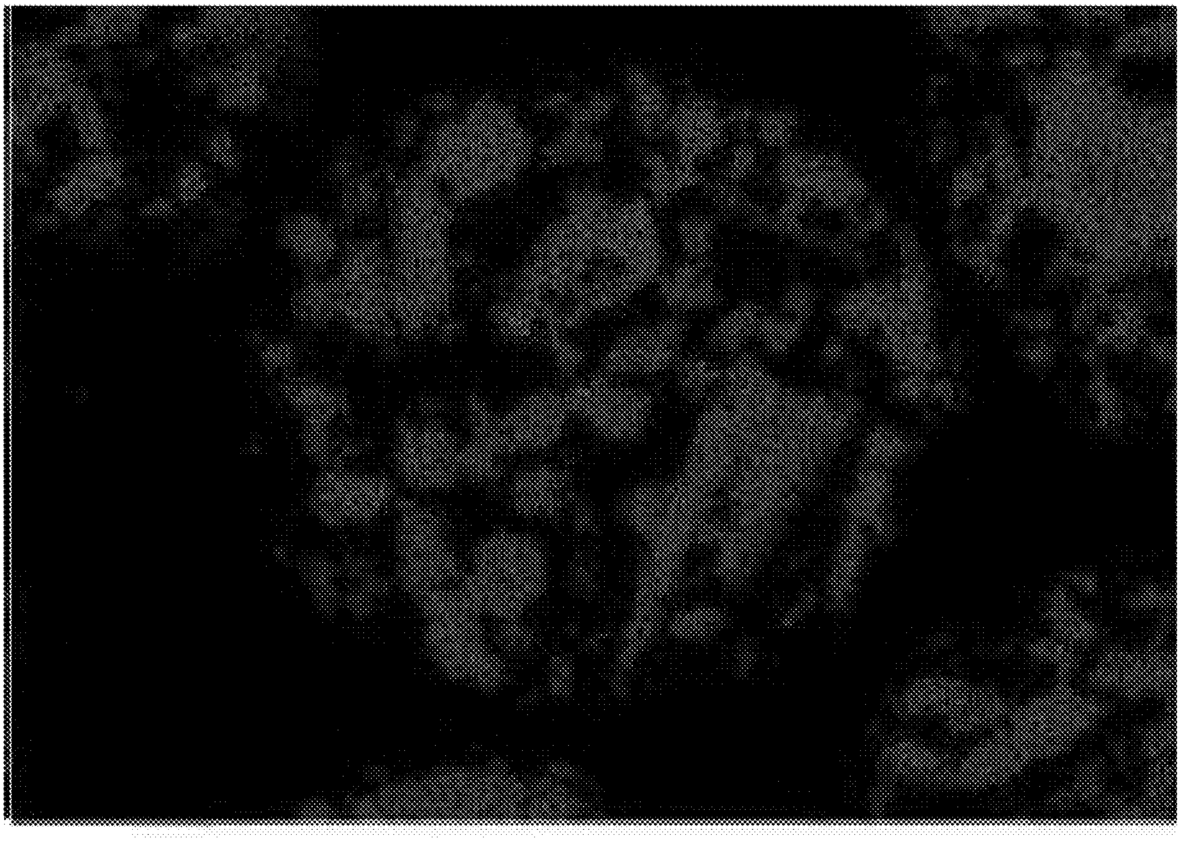
FIG. 4 is an EDS elemental (Ca) mapping in the cross-sectional SEM photograph of FIG. 1.
Figure 5:
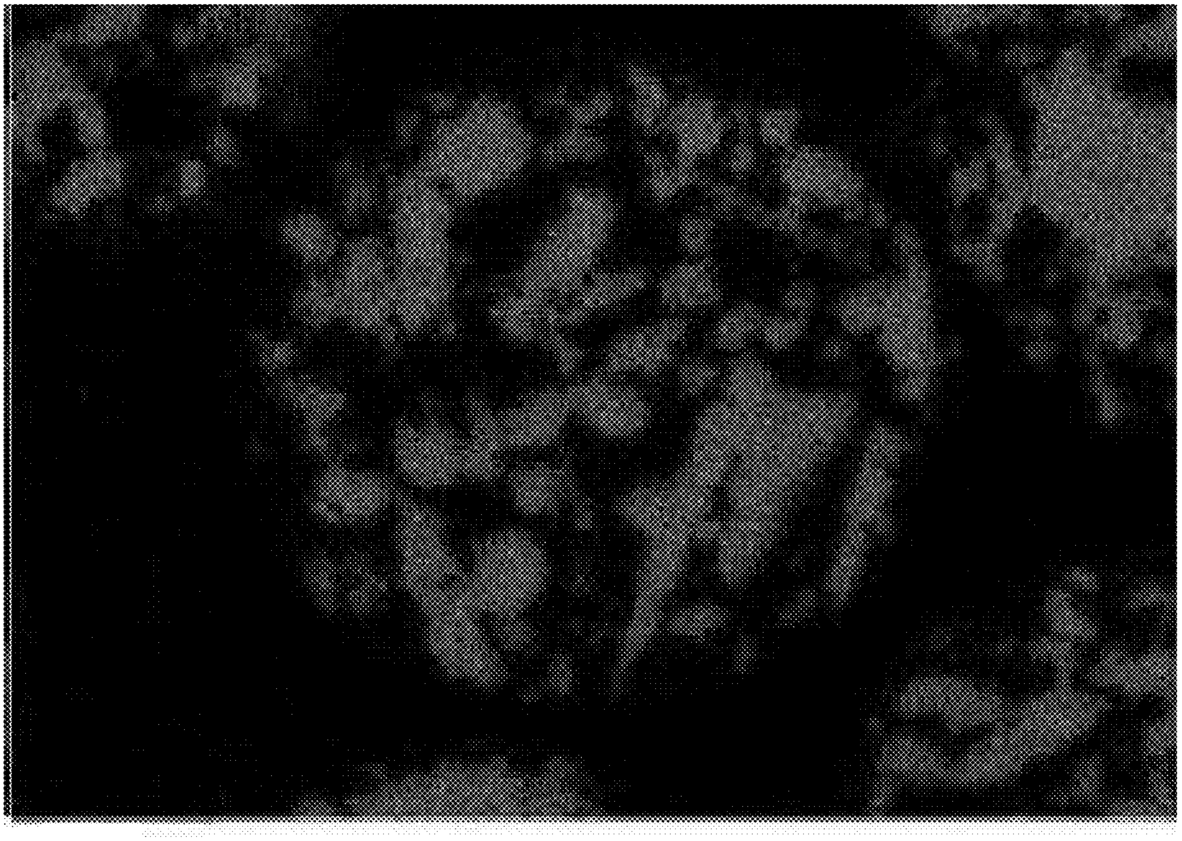
FIG. 5 is an EDS elemental (Si) mapping in the cross-sectional SEM photograph of FIG. 1.

One of the major features of a carrier core material according to the present invention is that the carrier core material contains $CaSiO_3$. As described above, conventionally, in order to lower the apparent density of the carrier core material, it has been proposed to add, as a raw material component of the carrier core material, $SiO_2$ (true density of about 2.2 g/cm$^3$) which has a lower true density than ferrite (true density of about 5 g/cm$^3$) which is a main component of the carrier core material. However, since $SiO_2$ easily absorbs moisture, failures occur such as a decrease in the charging characteristic of the carrier core material in a high-temperature, high-humidity environment. Hence, the present inventor et.al have conducted a thorough study of finding, instead of $SiO_2$, a material which is unlikely to be affected by a usage environment such as humidity, has a lower true density than ferrite and does not significantly affect the charging characteristic of the carrier core material. Consequently, the present inventor et.al have found that $CaSiO_3$ (true density of about 2.9 g/cm$^3$) satisfies the conditions described above, and thereby have achieved the present invention.

$CaSiO_3$ is preferably added as a raw material component. $CaSiO_3$ which is added as a raw material component is present in ferrite particles without reacting in a step of manufacturing the ferrite particles. A Ca raw material component and a Si raw material component may be added and mixed together with the raw material component of the ferrite particles, and $CaSiO_3$ may be synthesized in a calcination step to be contained in the ferrite particles. However, $CaSiO_3$ is preferably added from the beginning as the raw material component of the ferrite particles.

The content of $CaSiO_3$ is not particularly limited, and is preferably determined as necessary such that the true density of the carrier core material is in a range described later (3.5 g/cm$^3$ to 4.5 g/cm$^3$). In general, the content of $CaSiO_3$ in the carrier core material (ferrite particles) is preferably equal to or greater than 10% by mass and equal to or less than 50% by mass. The content of $CaSiO_3$ is more preferably equal to or greater than 15% by mass and equal to or less than 35% by mass.

$CaSiO_3$ which is used in the present invention is not particularly limited, and commercially available $CaSiO_3$ in a powder form can be suitably used.

Another of the major features of the carrier core material according to the present invention is that the true density of the carrier core material is equal to or greater than 3.5 g/cm$^3$ and equal to or less than 4.5 g/cm$^3$. The true density of the carrier core material is lower than that of the conventional carrier core material, and thus stress of a developer including a carrier caused by agitation within a development device is reduced, with the result that the crack and chip of toner spent and the carrier (carrier core material) are suppressed even in long-term use. The true density of the carrier core material is more preferably equal to or greater than 3.8 g/cm$^3$ and equal to or less than 4.5 g/cm$^3$.

The true density of the carrier core material can be mainly adjusted by the content of $CaSiO_3$. The true density of the carrier core material can also be adjusted by the ferrite composition of the carrier core material.

The composition of the ferrite particles of the carrier core material according to the present invention is preferably a composition represented by a composition formula $Mn_x Fe_{3-x}O_4$ (where $0 \le X < 3$). Preferably, the content of Ca is equal to or greater than 3.4% by mass and equal to or less than 15.8% by mass, and the content of Si is equal to or greater than 3.0% by mass and equal to or less than 11.4% by mass.

A particle strength index calculated from the formula (1) described previously in the carrier core material of the present invention is preferably equal to or less than 1.5% by volume. When the particle strength index of the carrier core material exceeds 1.5% by volume, the carrier (carrier core material) easily cracks or chips due to agitation within the development device or the like. Consequently, dielectric breakdown may occur from the cross section of the exposed carrier core material having low insulation, and thus white spots in an image may be generated. The particle strength index of the carrier core material is more preferably equal to or less than 1.0% by volume.

The apparent density of the carrier core material of the present invention is preferably equal to or greater than 1.7 g/cm$^3$ and equal to or less than 2.1 g/cm$^3$. The apparent density of the carrier core material is more preferably equal to or greater than 1.8 g/cm$^3$ and equal to or less than 2.0 g/cm$^3$.

The saturation magnetization $\sigma_s$ of the carrier core material of the present invention is preferably equal to or greater than 40 $Am^2/kg$ and equal to or less than 72 $Am^2/kg$. When the saturation magnetization $\sigma_s$ is less than 40 $Am^2/kg$, the magnetization per particle is decreased, and thus a failure (background portion carrier adhesion) in which part of the carrier is adhered to a non-image portion (background portion) of a photosensitive member or white spots in an image may easily occur. On the other hand, when the saturation magnetization $\sigma_s$ exceeds 72 $Am^2/kg$, a magnetic brush formed on the outer circumference of a development roller becomes hard, and thus the density of the magnetic brush is lowered, with the result that the amount of developer transported to a development region may be insufficient. The saturation magnetization $\sigma_s$ is more preferably equal to or greater than 53 $Am^2/kg$ and equal to or less than 67 $Am^2/kg$.

Residual magnetization $\sigma_r$ is preferably equal to or less than 2.5 $Am^2/kg$. When the residual magnetization $\sigma_r$ exceeds 2.5 $Am^2/kg$, it may be difficult to separate the carrier from the development roller. The residual magnetization $\sigma_r$ is more preferably equal to or less than 2.2 $Am^2/kg$.

The coercive force H of the carrier core material of the present invention is preferably equal to or less than 30 oersteds ($30\times10^3/(4\pi)$ A/m). When the coercive force $H_c$ exceeds 30 oersteds, the fluidity of the carrier and the ability to provide charge may deteriorate, and thus the toner may easily be scattered. The coercive force $H_c$ is more preferably equal to or less than 26 oersteds.

The volume average particle diameter (which may also be referred to as the "average particle diameter" below) $D_{50}$ measured with a laser diffraction particle size distribution measuring device for the carrier core material of the present invention is preferably equal to or greater than 30 μm and equal to or less than 50 μm, and more preferably equal to or greater than 30 μm and equal to or less than 40 μm. A cumulative value with a particle diameter of 22 μm or less in a total particle size distribution relative to volume is preferably equal to or less than 1.0%. When the cumulative value with a particle diameter of 22 μm or less exceeds 1.0%, the background portion carrier adhesion may occur.

The particle shape coefficient (ISO Circularity) of the carrier core material of the present invention is equal to or greater than 0.88 and equal to or less than 0.98. Although $CaSiO_3$ and ferrite are heterogeneous materials with different crystal structures, they can satisfactorily maintain their spherical shapes even under the influence of heat shrinkage during sintering. A measuring method will be described later.

(Manufacturing Method)

Although a method for manufacturing the carrier core material of the present invention is not particularly limited, a manufacturing method which will be described below is preferable.

The component raw material of the ferrite, $CaSiO_3$ and conventionally known additives as necessary are weighed. Examples of the component raw material of the ferrite include the component raw material of Fe, the component raw material of Mn and the like. As the component raw material of Fe, $Fe_2O_3$ or the like is suitably used. As the component raw material of Mn, $MnCO_3$, $Mn_3O_4$ or the like is used. Since the amount ratio of Fe, Mn, Ca and Si in the raw material is almost directly reflected on the composition ratio of elements in the carrier core material, the amounts of component raw materials of Fe and Mn and $CaSiO_3$ which are prepared are preferably adjusted so as to be the desired composition ratio of the carrier core material. Although the particle diameter and the form of $CaSiO_3$ are not particularly limited, in order to suppress a variation in magnetic force in the carrier core material, the average particle diameter of $CaSiO_3$ is preferably equal to or less than 15 μm, and the average aspect ratio thereof is preferably equal to or greater than 2.

Then, the component raw material of the ferrite, $CaSiO_3$ and the conventionally known additives as necessary are put into a dispersion medium, and thus slurry is produced. $CaSiO_3$ may be put into the dispersion medium at this time or may be mixed with the slurry after wet pulverization which will be described later. As the dispersion medium used in the present invention, water is suitable. A binder, a dispersant and the like may be mixed with the dispersion medium as necessary. As the binder, for example, polyvinyl alcohol can be suitably used. The amount of binder mixed is preferably set such that the concentration thereof in the slurry is about 0.1% by mass to 2% by mass. As the dispersant, for example, ammonium polycarboxylate and methacrylic acid polymers and the like can be suitably used. The amount of dispersant mixed is preferably set such that the concentration thereof in the slurry is about 0.1% by mass to 2% by mass. In addition, a reducing agent such as carbon black, a pH adjuster such as ammonia, a lubricant, a sintering accelerator and the like may be mixed. The solid content concentration of the slurry is preferably 50% by mass to 90% by mass. The solid content concentration of the slurry is more preferably 60% by mass to 80% by mass. When the solid content concentration of the slurry is equal to or greater than 60% by mass, there are few pores in particles within the granulated material, with the result that it is possible to prevent insufficient sintering during calcination.

The component raw material of the ferrite, $CaSiO_3$ and the additives as necessary which are weighed are mixed, pre-calcined and disaggregated, and are thereafter put into the dispersion medium, with the result that the slurry may be produced. The temperature of the pre-calcination is preferably 750° C. to 1000° ° C. The temperature of the pre-calcination is preferably equal to or greater than 750° C. because the mixture is partially formed into ferrite by the pre-calcination, a small amount of gas is generated during calcination and a solid-to-solid reaction proceeds sufficiently. On the other hand, the temperature of the pre-calcination is preferably equal to or less than 1000° C. because sintering caused by the pre-calcination is not sufficient and thus the raw materials can be sufficiently pulverized in a step of pulverizing the slurry later. In general, when the temperature of the pre-calcination is equal to or less than 1540° C., the crystal of $CaSiO_3$ can be maintained without $CaSiO_3$ being melted and decomposed. The atmospheric atmosphere is preferable as an atmosphere during the calcination.

Then, the slurry which is produced as described above is wet-pulverized. For example, a ball mill or a vibration mill is used to pulverize the slurry for a predetermined time. The average particle diameter of the raw materials after being pulverized is preferably equal to or less than 5 μm, and more preferably equal to or less than 2 μm. In the vibration mill or the ball mill, a medium having a predetermined particle diameter is preferably present. Examples of the medium include iron-based chromium steel, oxide-based zirconia, titania, and alumina and the like. The form of the pulverization step may be either a continuous type or a batch type. The particle diameter of the pulverized material is adjusted by a pulverizing time, a rotating speed, the material and the particle diameter of the medium used and the like.

When the slurry is produced, $CaSiO_3$ may be added into the slurry after being wet-pulverized without addition of $CaSiO_3$.

Then, the pulverized slurry is spray-dried to be granulated. Specifically, the slurry is introduced into a spray drying machine such as a spray dryer and is sprayed into the atmosphere to be granulated into a spherical shape. The atmosphere temperature at the time of the spray-drying is preferably 100° C. to 300° C. In this way, it is possible to obtain the spherical granulated material having a particle diameter of 10 μm to 200 μm. Then, as necessary, the obtained granulated material is classified using a vibrating sieve, and thus the granulated material having a predetermined particle diameter range is produced.

Then, the granulated material is put into a furnace which is heated to a predetermined temperature, and is calcined by a general method for synthesizing ferrite particles, and thus the ferrite particles are generated. A calcination temperature is preferably 1050° C. to 1350° C. The calcination temperature is more preferably 1100° C. to 1250° C. When the calcination temperature is equal to or less than 1050° C., phase transformation is unlikely to occur, and sintering is unlikely to proceed. When the calcination temperature exceeds 1350° C., excessive grains may be generated by excessive sintering. Since the ferrite particles of the present invention contain a large amount of $CaSiO_3$, when a temperature rise rate is excessively high, it is likely that the spherical shape is not maintained due to the influence of a difference in shrinkage speed during calcination. In particular, the temperature rise rate from 500° C. to the calcination temperature is preferably 100° C./h to 500° C./h. A holding time at the calcination temperature is preferably equal to or greater than 2 hours. An oxygen concentration in the temperature rise, the calcination and cooling is preferably controlled to be 0.05% to 21%.

The calcined material obtained as described above is disaggregated as necessary. Specifically, for example, a hammer mill or the like is used to disaggregate the calcined material. The form of the disaggregation step may be either a continuous type or a batch type. After the disaggregation treatment, as necessary, classification may be performed such that the particle diameter falls in a predetermined range. As a classification method, a conventionally known method such as wind classification or sieve classification can be used. After primary classification is performed with a wind classifier, the particle diameter may be adjusted to fall in a predetermined range using a vibrating sieve or an ultrasonic sieve. Furthermore, after the classification step, non-magnetic particles may be removed with a magnetic field beneficiation machine. The particle diameter of the ferrite particles is preferably equal to or greater than 30 μm and equal to or less than 50 μm.

Thereafter, as necessary, the classified ferrite particles may be heated in an oxidizing atmosphere to form an oxide film on the particle surface so as to increase the resistance of the ferrite particles (high resistance treatment). The oxidizing atmosphere may be either the atmospheric atmosphere or a mixed atmosphere of oxygen and nitrogen. A heating temperature is preferably equal to or greater than 200° C. and equal to or less than 800° C., and more preferably equal to or greater than 360° C. and equal to or less than 550° C. A heating time is preferably equal to or greater than 0.5 hours and equal to or less than 5 hours. In terms of homogenizing the surface and the inside of the ferrite particles, it is desirable that the heating temperature be low. The spinel-type ferrite particles produced as described above are used as the carrier core material of the present invention.

(Electrophotographic Development Carrier)

In an electrophotographic development carrier according to the present invention, the surface of the carrier core material produced as described above is coated with a resin.

As the resin with which the surface of the carrier core material is coated, a conventionally known resin can be used, and examples thereof include polyethylene, polypropylene, polyvinyl chloride, poly-4-methylpentene-1, polyvinylidene chloride, an ABS (acrylonitrile-butadiene-styrene) resin, polystyrene, a (meth) acrylic resin, a polyvinyl alcohol resin, thermoplastic elastomers of polyvinyl chloride, polyurethane, polyester, polyamide and polybutadiene and the like, a fluorine silicone resin and the like.

In order to coat the surface of the carrier core material with the resin, it is preferable to apply the solution or dispersion liquid of the resin to the carrier core material. As a solvent for the coating solution, one or two or more of aromatic hydrocarbon solvents such as toluene and xylene; ketone solvents such as acetone, methyl ethyl ketone, methyl isobutyl ketone and cyclohexanone; cyclic ether solvents such as tetrahydrofuran and dioxane; alcohol solvents such as ethanol, propanol and butanol; cellosolve solvents such as ethyl cellosolve and butyl cellosolve; ester solvents such as ethyl acetate and butyl acetate; amide solvents such as dimethylformamide and dimethylacetamide; and the like can be used. A resin component concentration in the coating solution is generally equal to or greater than 0.001% by mass and equal to or less than 30% by mass, and is particularly preferably equal to or greater than 0.001% by mass and equal to or less than 2% by mass.

As a method for coating the carrier core material with the resin, for example, a spray dry method, a fluidized bed method or a spray dry method using a fluidized bed, an immersion method or the like can be used. Among them, in terms of efficiently performing coating with a small amount of resin, the fluidized bed method is particularly preferable. For example, in the case of the fluidized bed method, a resin coating amount can be adjusted by the amount of resin solution which is sprayed or a spraying time.

For the particle diameter of the carrier, a volume average particle diameter is generally equal to or greater than 30 μm and equal to or less than 50 μm, and particularly preferably equal to or greater than 30 μm and equal to or less than 40 μm.

(Electrophotographic Developer)

An electrophotographic developer according to the present invention is obtained by mixing the carrier produced as described above and a toner. The mixing ratio of the carrier and the toner is not particularly limited, and may be determined as necessary from the development conditions of the development device which is used. In general, a toner concentration in the developer is equal to or greater than 1% by mass and equal to or less than 15% by mass. This is because when the toner concentration is less than 1% by mass, an image concentration is excessively low whereas when the toner concentration exceeds 15% by mass, the toner is scattered in the development device, and thus a stain in the device or a failure in which the toner is adhered to the background portion of transfer paper or the like may occur. The toner concentration is more preferably equal to or greater than 3% by mass and equal to or less than 10% by mass.

As the toner, a toner which is manufactured by a conventionally known method such as a polymerization method, a pulverization classification method, a melt granulation method or a spray granulation method can be used. Specifically, a toner obtained by containing a colorant, a release agent, a charge control agent and the like in a binder resin whose main component is a thermoplastic resin can be suitably used.

As the particle diameter of the toner, in general, a volume average particle diameter by a Coulter counter is preferably equal to or greater than 5 μm and equal to or less than 15 μm, and more preferably equal to or greater than 7 μm and equal to or less than 12 μm.

As necessary, a modifier may be added to the surface of the toner. Examples of the modifier include silica, alumina, zinc oxide, titanium oxide, magnesium oxide, polymethyl methacrylate and the like. One or two or more of them can be combined to be used.

For mixing the carrier and the toner, a conventionally known mixing device can be used. For example, a Henschel mixer, a V-type mixer, a tumbler mixer, a hybridizer or the like can be used.

(Development Device)

Figure 7:
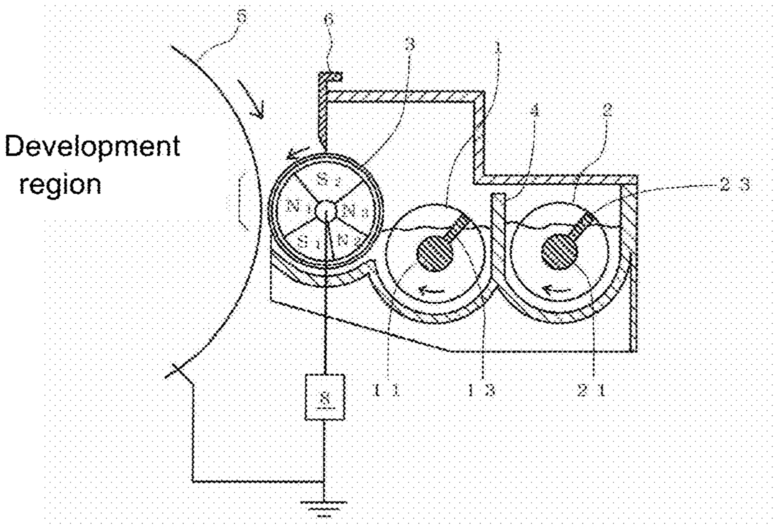
FIG. 7 is a schematic view showing an example of a development device which uses a carrier in the present invention.

Although a development method using the developer of the present invention is not particularly limited, a magnetic brush development method is preferably used. FIG. 7 shows a schematic diagram showing an example of a development device which performs magnetic brush development. The development device shown in FIG. 7 includes: a development roller 3 which incorporates a plurality of magnetic poles and is freely rotatable; a regulation blade 6 which regulates the amount of developer on the development roller 3 transported to a development portion; two screws 1 and 2 which are arranged parallel to a horizontal direction and respectively agitate and transport the developer in opposite directions; and a partition plate 4 which is formed between the two screws 1 and 2, makes it possible to move the developer from one screw to the other screw at both end portions of the screws and prevents the movement of the developer in the portions other than both the end portions.

In the two screws 1 and 2, spiral blades 13 and 23 are formed at the same inclination angles on shaft portions 11 and 21 and are rotated by an unillustrated drive mechanism in the same direction so as to respectively transport the developer in the opposite directions. At both the end portions of the screws 1 and 2, the developer is moved from one screw to the other screw. In this way, the developer formed with the toner and the carrier is constantly circulated and agitated within the device.

On the other hand, the development roller 3 includes a fixed magnet where within a metallic cylindrical member having concave and convex portions of a few micrometers in its surface, as a magnetic pole generating means, five magnetic poles of a development magnetic pole $N_1$, a transport magnetic pole $S_1$, a separation magnetic pole $N_2$, a pumping magnetic pole $N_3$ and a blade magnetic pole $S_2$ are sequentially arranged. When the cylindrical member of the development roller 3 is rotated in a direction indicated by an arrow, the developer is pumped up by the magnetic force of the pumping magnetic pole $N_3$ from the screw 1 to the development roller 3. The developer carried on the surface of the development roller 3 is regulated in layer by the regulation blade 6 and is thereafter transported to the development region.

In the development region, a bias voltage obtained by superimposing an alternating-current voltage on a direct-current voltage is applied from a transfer voltage power supply 8 to the development roller 3. The direct-current voltage component of the bias voltage is set to a potential between the potential of a background portion and the potential of an image portion on the surface of a photosensitive drum 5. The potential of the background portion and the potential of the image portion are set to potentials between the maximum value and the minimum value of the bias voltage. The peak-to-peak voltage of the bias voltage preferably falls in a range of 0.5 kV to 5 kV, and the frequency preferably falls in a range of 1 kHz to 10 kHz. The waveform of the bias voltage may be any waveform such as a rectangular wave, a sine wave or a triangular wave. In this way, the toner and the carrier are vibrated in the development region, the toner is adhered to an electrostatic latent image on the photosensitive drum 5 and thus the development is performed.

Thereafter, the developer on the development roller 3 is transported by the transport magnetic pole $S_1$ into the device, is separated by the separation magnetic pole $N_2$ from the development roller 3, is circulated and transported again by the screws 1 and 2 within the device and is agitated and mixed with the developer which is not subjected to the development. Then, the developer is newly supplied by the pumping magnetic pole $N_3$ from the screw 1 to the development roller 3.

Although in the embodiment shown in FIG. 7, the number of magnetic poles incorporated in the development roller 3 is five, the number of magnetic poles may naturally be increased to 8, 10 or 12 so that the amount of movement of the developer in the development region is further increased or that the pumping property or the like is further enhanced.

EXAMPLES

Although the present invention will be more specifically described below using Examples, the present invention is not limited at all to these Examples.

Example 1

As raw materials, 4.9 kg of $Fe_2O_3$ (average particle diameter of 0.6 μm), 1.9 kg of $Mn_3O_4$ (average particle diameter of 3.4 μm) and 3.1 kg of $CaSiO_3$ (an average particle diameter of 5 μm and an average aspect ratio of 3) were dispersed in 3.2 kg of pure water, and as dispersants, 81.7 g of an ammonium polycarboxylate-based dispersant and 6.2 g of ammonia water (25 wt % aqueous solution) were added, with the result that a mixture was obtained. The mixture was subjected to pulverization treatment using a wet ball mill (medium diameter of 2 mm), and thus mixed slurry was obtained.

The mixed slurry was sprayed with a spray drier into hot air of about 140° C., and thus a dried granulated material having a particle diameter of 10 μm to 75 μm was obtained. Minute particles whose particle diameter was less than 25 μm were removed from the granulated material with a sieve.

The granulated material was put into an electric furnace, and the temperature thereof was increased to 1170° ° C. for 4.5 hours such that a temperature rise rate in a temperature region from 500° ° C. to 1170° C. is 180° C./h. Thereafter, the temperature was held at 1170° C. for 3 hours, and thus calcination was performed. The concentration of oxygen within the electric furnace was adjusted so as to be 3000 ppm.

The calcined material obtained was disaggregated with a hammer mill and was thereafter classified using a vibrating sieve, and thus a carrier core material which had sufficient sphericity and an average particle diameter of 36.0 μm as the carrier core material was obtained.

The powder property, the shape property, the magnetic property and the like of the carrier core material obtained were measured by methods described later. The results of the measurement are shown in Tables 1 and 2.

Figure 6:
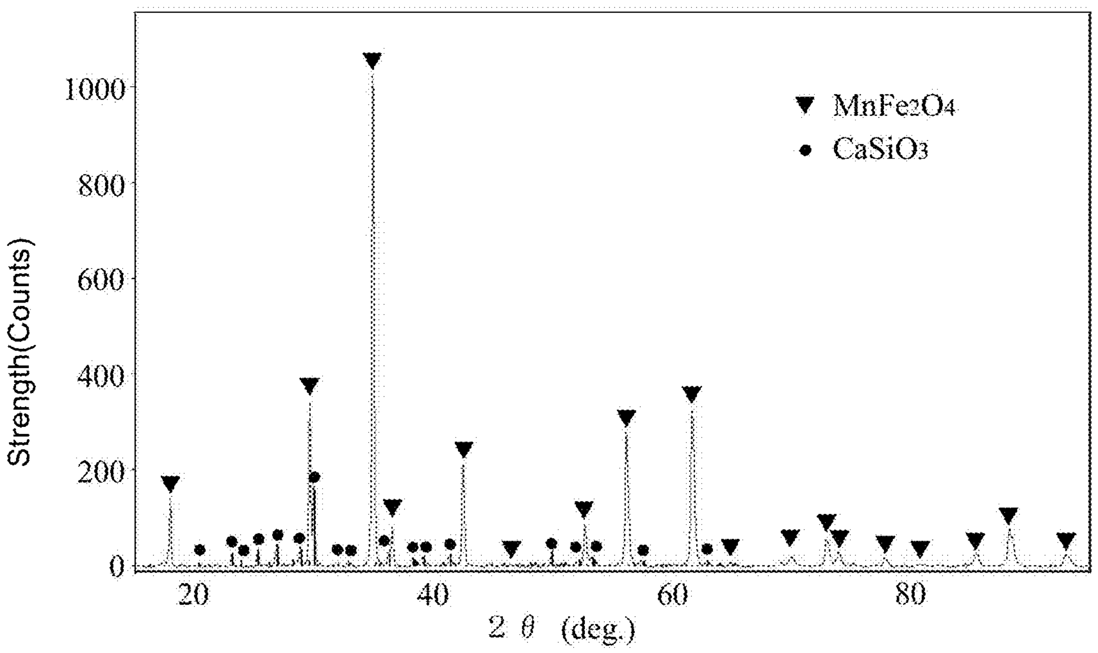
FIG. 6 is the results of an XRD measurement for the carrier core material in Example 1.

A cross-sectional SEM photograph of the carrier core material obtained is shown in FIG. 1. EDS elemental mappings of Fe, Mn, Ca and Si in the cross-sectional SEM photograph shown in FIG. 1 are shown in FIGS. 2 to 5. The results of XRD measurements of the carrier core material in Example 1 are further shown in FIG. 6.

Then, the surface of the carrier core material obtained as described above was coated with a resin, and thus a carrier was produced. Specifically, 450 parts by mass of silicone resin and 9 parts by mass of (2-aminoethyl)aminopropyl trimethoxysilane were dissolved in 450 parts by mass of toluene serving as a solvent, with the result that a coating solution was produced. 50000 parts by mass of the carrier core material was coated with the coating solution using a fluidized bed type coating device, and was heated in the electric furnace of 300° C., and thus the carrier was obtained. In Examples and Comparative Examples below, the carriers were obtained in the same manner.

The carrier obtained and a toner having an average particle diameter of about 5.0 μm were mixed with a pot mill for a predetermined time, and thus a two-component electrophotographic developer was obtained. In this case, the carrier and the toner were adjusted such that mass of toner/(mass of toner and carrier)=5/100. Hereinafter, in all Examples and Comparative Examples, developers were obtained in the same manner. For the developers obtained, evaluations to be described later were performed using an actual machine. In Examples and Comparative Examples below, the evaluations using the actual machine were performed in the same manner. The results of the evaluations are shown in Table 2.

Example 2

The carrier core material of Example 1 was held at a temperature of 400° C. for 1.5 hours in the atmospheric atmosphere, and the oxidation treatment (high resistance treatment) was performed, with the result that a carrier core material which had sufficient sphericity and an average particle diameter of 36.0 μm as the carrier core material was obtained.

The powder property, the shape property, the magnetic property and the like of the carrier core material obtained were measured by the methods described later. The results of the measurement are shown in Tables 1 and 2.

Example 3

A carrier core material which had sufficient sphericity and an average particle diameter of 37.7 μm as the carrier core material was obtained in the same manner as in Example 2 except that the oxidation treatment (high resistance treatment) was performed at a temperature of 430° C.

The powder property, the shape property, the magnetic property and the like of the carrier core material obtained were measured by the methods described later. The results of the measurement are shown in Tables 1 and 2.

Example 4

A carrier core material which had sufficient sphericity and an average particle diameter of 37.7 μm as the carrier core material was obtained in the same manner as in Example 2 except that the oxidation treatment (high resistance treatment) was performed at a temperature of 460° C.

The powder property, the shape property, the magnetic property and the like of the carrier core material obtained were measured by the methods described later. The results of the measurement are shown in Tables 1 and 2.

Example 5

As raw materials, 5.7 kg of $Fe_2O_3$ (average particle diameter of 0.6 μm), 2.2 kg of $Mn_3O_4$ (average particle diameter of 3.4 μm) and 2.1 kg of $CaSiO_3$ (an average particle diameter of 5 μm and an average aspect ratio of 3) were dispersed in 3.2 kg of pure water, and as dispersants, 81.7 g of an ammonium polycarboxylate-based dispersant and 6.2 g of ammonia water (25 wt % aqueous solution) were added, with the result that a mixture was obtained. The mixture was subjected to pulverization treatment using a wet ball mill (medium diameter of 2 mm), and thus mixed slurry was obtained.

The mixed slurry was sprayed with a spray drier into hot air of about 140° C., and thus a dried granulated material having a particle diameter of 10 μm to 75 μm was obtained. Minute particles whose particle diameter was less than 25 μm were removed from the granulated material with a sieve.

The granulated material was put into an electric furnace, and the temperature thereof was increased to 1170° ° C. for 4.5 hours such that a temperature rise rate in a temperature region from 500° ° C. to 1170° C. is 180° C./h. Thereafter, the temperature was held at 1170° C. for 3 hours, and thus calcination was performed. The concentration of oxygen within the electric furnace was adjusted so as to be 3000 ppm.

The calcined material obtained was disaggregated with a hammer mill and was thereafter classified using a vibrating sieve, and thus a carrier core material which had sufficient sphericity and an average particle diameter of 35.7 μm as the carrier core material was obtained.

The powder property, the shape property, the magnetic property and the like of the carrier core material obtained were measured by the methods described later. The results of the measurement are shown in Tables 1 and 2.

Example 6

The carrier core material of Example 5 was held at a temperature of 400° ° C. for 1.5 hours in the atmospheric atmosphere, and the oxidation treatment (high resistance treatment) was performed, with the result that a carrier core material which had sufficient sphericity and an average particle diameter of 35.7 μm as the carrier core material was obtained.

The powder property, the shape property, the magnetic property and the like of the carrier core material obtained were measured by the methods described later. The results of the measurement are shown in Tables 1 and 2.

Example 7

A carrier core material which had sufficient sphericity and an average particle diameter of 35.7 μm as the carrier core material was obtained in the same manner as in Example 6 except that the oxidation treatment (high resistance treatment) was performed at a temperature of 430° C.

The powder property, the shape property, the magnetic property and the like of the carrier core material obtained were measured by the methods described later. The results of the measurement are shown in Tables 1 and 2.

Example 8

A carrier core material which had sufficient sphericity and an average particle diameter of 35.7 μm as the carrier core material was obtained in the same manner as in Example 6 except that the oxidation treatment (high resistance treatment) was performed at a temperature of 460° C.

The powder property, the shape property, the magnetic property and the like of the carrier core material obtained were measured by the methods described later. The results of the measurement are shown in Tables 1 and 2.

Example 9

As raw materials, 5.6 kg of $Fe_2O_3$ (average particle diameter of 0.6 μm), 2.2 kg of $Mn_3O_4$ (average particle diameter of 3.4 μm) and 2.2 kg of $CaSiO_3$ (an average particle diameter of 5 μm and an average aspect ratio of 3) were dispersed in 3.2 kg of pure water, and as dispersants, 81.7 g of an ammonium polycarboxylate-based dispersant and 6.2 g of ammonia water (25 wt % aqueous solution) were added, with the result that a mixture was obtained. The mixture was subjected to pulverization treatment using a wet ball mill (medium diameter of 2 mm), and thus mixed slurry was obtained.

The mixed slurry was sprayed with a spray drier into hot air of about 140° C., and thus a dried granulated material having a particle diameter of 10 μm to 75 μm was obtained. Minute particles whose particle diameter was less than 25 μm were removed from the granulated material with a sieve.

The granulated material was put into an electric furnace, and the temperature thereof was increased to 1170° C. for 4.5 hours such that a temperature rise rate in a temperature region from 500° ° C. to 1170° C. is 180° C./h. Thereafter, the temperature was held at 1170° C. for 3 hours, and thus calcination was performed. The concentration of oxygen within the electric furnace was adjusted so as to be 3000 ppm.

The calcined material obtained was disaggregated with a hammer mill and was thereafter classified using a vibrating sieve, and thus a carrier core material which had sufficient sphericity and an average particle diameter of 35.8 μm as the carrier core material was obtained.

The powder property, the shape property, the magnetic property and the like of the carrier core material obtained were measured by the methods described later. The results of the measurement are shown in Tables 1 and 2.

Example 10

The carrier core material of Example 9 was held at a temperature of 400° C. for 1.5 hours in the atmospheric atmosphere, and the oxidation treatment (high resistance treatment) was performed, with the result that a carrier core material which had sufficient sphericity and an average particle diameter of 35.8 μm as the carrier core material was obtained.

The powder property, the shape property, the magnetic property and the like of the carrier core material obtained were measured by the methods described later. The results of the measurement are shown in Tables 1 and 2.

Example 11

A carrier core material which had sufficient sphericity and an average particle diameter of 35.4 μm as the carrier core material was obtained in the same manner as in Example 9 except that the calcination was performed at a calcination temperature of 1145° C. in the electric furnace.

The powder property, the shape property, the magnetic property and the like of the carrier core material obtained were measured by the methods described later. The results of the measurement are shown in Tables 1 and 2.

Example 12

The carrier core material of Example 11 was held at a temperature of 400° C. for 1.5 hours in the atmospheric atmosphere, and the oxidation treatment (high resistance treatment) was performed, with the result that a carrier core material which had sufficient sphericity and an average particle diameter of 35.4 μm as the carrier core material was obtained.

The powder property, the shape property, the magnetic property and the like of the carrier core material obtained were measured by the methods described later. The results of the measurement are shown in Tables 1 and 2.

Comparative Example 1

As raw materials, 7.2 kg of $Fe_2O_3$ (average particle diameter of 0.6 μm) and 2.8 kg of $Mn_3O_4$ (average particle diameter of 3.4 μm) were dispersed in 2.4 kg of pure water, and as a reducing agent, 48.0 g of carbon black and as dispersants, 60.4 g of an ammonium polycarboxylate-based dispersant and 6.2 g of ammonia water (25 wt % aqueous solution) were added, with the result that a mixture was obtained. The mixture was subjected to pulverization treatment using a wet ball mill (medium diameter of 2 mm), and thus mixed slurry was obtained.

The mixed slurry was sprayed with a spray drier into hot air of about 140° C., and thus a dried granulated material having a particle diameter of 10 μm to 75 μm was obtained. Minute particles whose particle diameter was less than 25 μm were removed from the granulated material with a sieve.

The granulated material was put into an electric furnace, and the temperature thereof was increased to 1035° C. for 4.5 hours. Thereafter, the temperature was held at 1035° C. for 3 hours, and thus calcination was performed. The concentration of oxygen within the electric furnace was adjusted so as to be 500 ppm.

The calcined material obtained was disaggregated with a hammer mill and was thereafter classified using a vibrating sieve, and thus the calcined material which had an average particle diameter of 34.6 μm was obtained.

The powder property, the shape property, the magnetic property and the like of the carrier core material obtained were measured by the methods described later. The results of the measurement are shown in Tables 1 and 2.

Comparative Example 2

As raw materials, 7.2 kg of $Fe_2O_3$ (average particle diameter of 0.6 μm) and 2.8 kg of $Mn_3O_4$ (average particle diameter of 3.4 μm) were dispersed in 2.4 kg of pure water, and as a reducing agent, 21.8 g of carbon black and as dispersants, 62.2 g of an ammonium polycarboxylate-based dispersant and 6.2 g of ammonia water (25 wt % aqueous solution) were added, with the result that a mixture was obtained. The mixture was subjected to pulverization treatment using a wet ball mill (medium diameter of 2 mm), and thus mixed slurry was obtained.

The mixed slurry was sprayed with a spray drier into hot air of about 140° C., and thus a dried granulated material having a particle diameter of 10 μm to 75 μm was obtained. Minute particles whose particle diameter was less than 25 μm were removed from the granulated material with a sieve.

The granulated material was put into an electric furnace, and the temperature thereof was increased to 1200° C. for 4.5 hours. Thereafter, the temperature was held at 1200° C. for 3 hours, and thus calcination was performed. The concentration of oxygen within the electric furnace was adjusted so as to be 3000 ppm.

The calcined material obtained was disaggregated with a hammer mill and was thereafter classified using a vibrating sieve, the calcined material obtained by the classification was held at 400° ° C. for 1.5 hours in the atmospheric atmosphere and thus the oxidation treatment (high resistance treatment) was performed, with the result that a carrier core material which had an average particle diameter of 34.4 μm was obtained.

The powder property, the shape property, the magnetic property and the like of the carrier core material obtained were measured by the methods described later. The results of the measurement are shown in Tables 1 and 2.

Comparative Example 3

As raw materials, 6.5 kg of $Fe_2O_3$ (average particle diameter of 0.6 μm), 2.5 kg of $Mn_3O_4$ (average particle diameter of 3.4 μm) and 1.0 kg of $CaSiO_3$ (an average particle diameter of 5 μm and an average aspect ratio of 3) were dispersed in 3.2 kg of pure water, and as dispersants, 81.7 g of an ammonium polycarboxylate-based dispersant and 6.2 g of ammonia water (25 wt % aqueous solution) were added, with the result that a mixture was obtained. The mixture was subjected to pulverization treatment using a wet ball mill (medium diameter of 2 mm), and thus mixed slurry was obtained.

The mixed slurry was sprayed with a spray drier into hot air of about 140° C., and thus a dried granulated material having a particle diameter of 10 μm to 75 μm was obtained. Minute particles whose particle diameter was less than 25 μm were removed from the granulated material with a sieve.

The granulated material was put into an electric furnace, and the temperature thereof was increased to 1170° C. for 4.5 hours such that a temperature rise rate in a temperature region from 500° ° C. to 1170° C. is 180° C./h. Thereafter, the temperature was held at 1170° C. for 3 hours, and thus calcination was performed. The concentration of oxygen within the electric furnace was adjusted so as to be 3000 ppm.

The calcined material obtained was disaggregated with a hammer mill and was thereafter classified using a vibrating sieve, and thus a carrier core material which had sufficient sphericity and an average particle diameter of 35.8 μm as the carrier core material was obtained.

The powder property, the shape property, the magnetic property and the like of the carrier core material obtained were measured by the methods described later. The results of the measurement are shown in Tables 1 and 2.

(Composition Analysis)

(Analysis of Fe)

The carrier core material including an ion element was weighed and dissolved in mixed acid water of hydrochloric acid and nitric acid. This solution was evaporated to dryness and was thereafter dissolved again by adding sulfuric acid water, and thus excessive hydrochloric acid and nitric acid were volatilized. Solid aluminum was added into this solution, and thus all $Fe^{3+}$ ions in the solution were reduced to $Fe^{2+}$ ions. Then, the amount of $Fe^{2+}$ irons in this solution was subjected to potentiometric titration using a potassium permanganate solution, and thus quantitative analysis was performed, with the result that the titer of Fe ($Fe^{2+}$) was determined.

(Analysis of Mn)

For the content of Mn in the carrier core material, quantitative analysis was performed according to a ferromanganese analysis method (potentiometric titration method) described in JIS G 1311-1987. The content of Mn in the carrier core material described in the present specification is the amount of Mn which was obtained by performing the quantitative analysis with the ferromanganese analysis method (potentiometric titration method).

(Analysis of Ca)

The content of Ca in the carrier core material was analyzed by the following method. The carrier core material according to the invention of the present application was dissolved in an acid solution, and quantitative analysis was performed by ICP. The content of Ca in the carrier core material described in the present invention is the amount of Ca which was obtained by performing the quantitative analysis with ICP.

(Analysis of Si)

For the content of Si in the carrier core material, quantitative analysis was performed according to a silicon dioxide weight method described in JIS M8214-1995.

(Calculation of Content of $CaSiO_3$)

The content of $CaSiO_3$ was calculated by the amount of Ca in the carrier core material using a calculation formula described below.

$CaSiO_3$ content (% by mass)=(Ca content in carrier core material (% by mass))×($CaSiO_3$ molecular weight: 116.17 g/mol)/(Ca atomic weight: 40.08 g/mol)

(Apparent Density AD)

The apparent density of the carrier core material was measured according to JIS Z 2504.

(Fluidity FR)

The fluidity of the carrier core material was measured according to JIS Z 2502.

(Average Particle Diameter $D_{50}$ and Ratio with Particle Diameter of 22 μm or Less)

A total particle size distribution of the carrier core material relative to volume was measured with a laser diffraction particle size distribution measuring device ("Microtrac Model 9320-X100" made by Nikkiso Co., Ltd.), and the average particle size $D_{50}$ of the carrier core material and a cumulative value with a particle diameter of 22 μm or less were determined.

(Pore Volume)

The pore volume of the carrier core material was measured as follows. As an evaluation device, POREMASTER-60GT made by Quantachrome Corporation was used. Specific measurement conditions were as follows: cell stem volume: 0.5 ml, head pressure: 20 PSIA, surface tension of mercury: 485.00 erg/cm$^2$, contact angle of mercury: 130.00 degrees, high pressure measurement mode: fixed rate, motor speed: 1, high pressure measurement range: 20.00 to 10000.00 PSI, 1.200 g of a sample was weighed and filled in a cell of 0.5 ml (cm$^3$) and a measurement was performed. The pore volume was obtained by subtracting a volume A (ml/g) at 100 PSI from a volume B (ml/g) at 10000.00 PSI.

(BET Specific Surface Area)

An evaluation was performed using a BET one-point specific surface area measuring device (made by MOUNTECH Co., Ltd., model: Macsorb HM model-1208). Specifically, 10.000 g of a sample was weighed and filled in a cell having a diameter of 15 mm, and was degassed at 200° ° C. for 30 minutes and a measurement was performed.

(True Density)

The true density of the carrier core material was measured using "ULTRA PYCNOMETER 1000" made by Quantachrome Corporation.

(Particle Shape Coefficient: ISO Circularity)

The particle shape coefficient was measured with the following measuring device under measurement conditions below.

Measuring device: injection type image analysis particle size distribution meter "IF-3200" made by JASCO Corporation Analysis software: PIA-Pro 14.18

Sample preparation conditions: 0.07 g of a sample was dispersed in a screw vial (capacity of 9 $cm^3$) containing 9 $cm^3$ of polyethylene glycol 400, and then the measurement was performed.

Measurement conditions: telecentric zoom lens with 2× magnification, front lens with 2× magnification, calibration value of 0.417 μm/pixel, spacer thickness of 150 μm, sampling of 20%, analysis type of relative measurement, measured amount of 0.95 $cm^3$, analysis of dark detection, threshold value of 166 (fill in holes), O-Roughness filter of 0.5

Filter Conditions During Measurement:

ISO Area Diameter: minimum value of 1, maximum value of 150, inner range

Analysis Filter Conditions:

ISO Area Diameter: minimum value of 10, maximum value of 55, inner range

ISO Solidity: minimum value of 0.97, maximum value of 1, inner range

ISO Circularity: ratio of a diameter equivalent to an area circle to a diameter equivalent to a perimetral circle Calculation Formula for ISO Circularity:

π×Area Diameter(diameter equivalent to a circular area)/perimeter(perimeter)

(Particle Strength Index)

30 g of the carrier core material was put into a sample mill ("SK-MI0 Model" made by Kyoritsu Riko Co., Ltd.), and a crush test was performed at a rotation speed of 14000 rpm for 60 seconds. A difference between cumulative values (% by volume) with a particle diameter of 22 μm or less in the total particle size distribution of the carrier core material before and after the crush test was determined, and was set as the particle strength index of the carrier core material. The total particle size distribution of the carrier core material was measured using the laser diffraction particle size distribution measuring device ("Microtrac Model 9320-X100" made by Nikkiso Co., Ltd.). The unit was % by volume.

(Magnetic Property)

A room-temperature dedicated vibration sample type magnetometer (VSM) ("VSM-P7" made by Toei Industry Co., Ltd.) was used to apply an external magnetic field in a range of 0 to 79.58×$10^4$ A/m (10000 oersteds) continuously in one cycle, and thus magnetization $\sigma_{1k}$, saturation magnetization $\sigma_s$, residual magnetization $\sigma_r$ and a coercive force He when a magnetic field of 79.58×$10^3$ A/m (1000 oersteds) was applied were measured.

(Electrical Resistance)

Two brass plates whose surfaces were electropolished and whose thicknesses were 2 mm were arranged as electrodes such that the distance between the electrodes was 2 mm, 200 mg of the carrier core material was inserted into a gap between the two electrode plates, then a magnet having a cross-sectional area of 240 $mm^2$ was arranged behind each of the electrode plates, in a state where a bridge of powder to be measured was formed between the electrodes, a direct-current voltage of 1000 V was applied between the electrodes and thus the value of a current flowing through the carrier core material was measured by a four-terminal method. The electrical resistance of the carrier core material was calculated from the current value, the electrode-to-electrode distance of 2 mm and the cross-sectional area of 240 $mm^2$.

(Cross-Sectional SEM Photograph, EDS Elemental Mapping)

The carrier core material was dispersed in a resin, vacuum defoaming treatment was performed and thus the resin was filled in the carrier core material, and then the resulting mixture was applied to an auxiliary plate, and heat treatment was performed at a temperature of 200° C. for 20 minutes, with the result that the resin was cured. Thereafter, the carrier core material was cut using a cross session polisher (SM-09010 made by JEOL Ltd.). Then, the cross section of the carrier core material was shot with a scanning electron microscope (JSM-6510LA type made by JEOL Ltd.). Mapping images of a Fe element, a Mn element, a Ca element and a Si element were acquired by EDS.

(Powder X-Ray Diffraction (XRD) Measurement)

A powder X-ray diffraction measurement of the carrier core material was performed using "Ultima IV" made by Rigaku Corporation. A Cu tube (Kα) was used as an X-ray source, and X-rays were generated under the conditions of an acceleration voltage of 40 kV and a current of 20 mA. A divergence slit aperture angle was set to 1°, a scattering slit aperture angle was set to 1°, a light receiving slit width was set to 0.15 mm and a scanning range was set to $15° \leq 2\theta \leq 95°$. The generated phase was identified from the X-ray diffraction pattern obtained. When a peak of $CaSiO_3$ can be confirmed in the X-ray diffraction pattern obtained, it can be determined that the carrier core material contains $CaSiO_3$.

(Evaluation of Toner Spent)

The two-component developer which was produced was put into the development device of the structure shown in FIG. 7 (the peripheral velocity $v_1$ of the development roller: 406 mm/sec, the peripheral velocity $v_2$ of the photosensitive drum: 205 mm/sec and a distance between the photosensitive drum and the development roller: 0.3 mm), the developer was agitated for 36 hours, thereafter carriers were extracted from the developer and the carriers were observed with the scanning electron microscope (JSM-6510LA type made by JEOL Ltd.) and the ratio of the number of carriers the surfaces of which the toner was adhered to was measured.

"Excellent": The ratio of the number of carriers to which the toner was adhered was less than 0.5%.

"Good": The ratio of the number of carriers to which the toner was adhered was equal to or greater than 0.5% and less than 1.0%.

"Fair": The ratio of the number of carriers to which the toner was adhered was equal to or greater than 1.0% and less than 5.0%.

"Poor": The ratio of the number of carriers to which the toner was adhered was equal to or greater than 5.0%.

(Evaluation of White Spots in Image)

The two-component developer which was produced was put into the development device of the structure shown in FIG. 7 (the peripheral velocity $v_1$ of the development roller: 406 mm/sec, the peripheral velocity $v_2$ of the photosensitive drum: 205 mm/sec and the distance between the photosensitive drum and the development roller: 0.3 mm), ten solid black images were developed and printed both in an initial state and after the printing of one hundred thousand sheets, and the degree of white spots in a solid black portion was visually evaluated according to the following criteria.

"Excellent": No white spots were confirmed and satisfactory images were achieved.

"Good": Less than five white spots were present.

"Fair": Five to ten white spots were present.

"Poor": Ten or more white spots were definitely present.

It has been found from the cross-sectional SEM photograph of the carrier core material in FIG. 1 that there were almost no voids within the carrier core material. It has been found from the EDS elemental mappings of Fe, Mn, Ca and Si in the cross-sectional SEM photographs shown in FIGS. 2 to 5 that Fe and Mn were present in a common region, Ca and Si were also present in a common region and these two regions did not overlap each other. It has been found from the results of the XRD analysis of FIG. 6 that the composition of $MnFe_2O_4$ and the composition of $CaSiO_3$ were present in the carrier core material of FIG. 1. Hence, it is said that in the carrier core material of Example 1, $CaSiO_3$ was dispersed in $MnFe_2O_4$. In Examples 2 to 12, the same results as in the cross-sectional SEM photographs, the EDS elemental mappings and the XRD analysis described above were obtained.

TABLE 1

| | $CaSiO_3$ Content (mass %) | Composition (mass %) Fe | Mn | Ca | Si | Apparent density g/cm$^3$ | Fluidity sec/50 g | $D_{50}$ μm | 22 μm or less % | Pore volume cm$^3$/g | Specific surface area m$^2$/g | Particle strength index volume % |
|---|---|---|---|---|---|---|---|---|---|---|---|---|
| Example 1 | 27.8 | 36.0 | 14.0 | 9.6 | 7.1 | 1.87 | 39.8 | 36.0 | 0.6 | 0.007 | 0.15 | 0.2 |
| Example 2 | 27.8 | 36.0 | 14.0 | 9.6 | 7.1 | 1.94 | 36.7 | 36.0 | 0.6 | 0.008 | 0.16 | 0.3 |
| Example 3 | 27.8 | 36.0 | 14.0 | 9.6 | 7.1 | 1.93 | 35.2 | 37.7 | 0.3 | 0.008 | 0.17 | 0.2 |
| Example 4 | 27.8 | 36.0 | 14.0 | 9.6 | 7.1 | 1.92 | 35.3 | 37.7 | 0.3 | 0.011 | 0.19 | 0.2 |
| Example 5 | 19.1 | 41.3 | 15.9 | 6.6 | 5.0 | 1.93 | 39.6 | 35.7 | 0.8 | 0.006 | 0.16 | 0.8 |
| Example 6 | 19.1 | 41.3 | 15.9 | 6.6 | 5.0 | 2.02 | 34.8 | 35.7 | 0.8 | 0.007 | 0.17 | 0.6 |
| Example 7 | 19.1 | 41.3 | 15.9 | 6.6 | 5.0 | 1.99 | 34.4 | 35.7 | 0.8 | 0.007 | 0.18 | 0.7 |
| Example 8 | 19.1 | 41.3 | 15.9 | 6.6 | 5.0 | 1.95 | 34.7 | 35.7 | 0.8 | 0.009 | 0.17 | 0.8 |
| Example 9 | 20.7 | 40.7 | 15.5 | 7.1 | 5.2 | 1.88 | 41.6 | 35.8 | 1.0 | 0.009 | 0.14 | 0.8 |
| Example10 | 20.7 | 40.7 | 15.5 | 7.1 | 5.2 | 1.97 | 34.9 | 35.8 | 1.0 | 0.007 | 0.15 | 0.7 |
| Example11 | 20.7 | 40.7 | 15.5 | 7.1 | 5.2 | 1.84 | 34.9 | 35.4 | 1.0 | 0.021 | 0.18 | 0.7 |
| Example12 | 20.7 | 40.7 | 15.5 | 7.1 | 5.2 | 1.92 | 35.7 | 35.4 | 1.0 | 0.021 | 0.20 | 0.6 |
| Comparative Example 1 | — | 51.4 | 19.9 | — | — | 2.07 | — | 34.6 | 1.2 | 0.029 | 0.26 | 2.7 |
| Comparative Example 2 | — | 51.4 | 20.0 | — | — | 2.42 | 25.9 | 34.4 | 1.1 | 0.006 | 0.12 | 2.3 |
| Comparative Example 3 | 8.3 | 47.1 | 18.2 | 2.9 | 2.3 | 2.11 | 34.5 | 35.8 | 1.1 | 0.006 | 0.11 | 2.2 |

TABLE 2

| | True density g/cm$^3$ | Particle shape coeffecient | $\sigma_s$ Am$^2$/kg | $\sigma_{1k}$ Am$^2$/kg | $\sigma_r$ Am$^2$/kg | $H_c$ Oersteds | Resistance (1000 v) Ω | Toner spent | White spots in image Initial state | After 100k |
|---|---|---|---|---|---|---|---|---|---|---|
| Example 1 | 4.0 | 91.0 | 57.8 | 43.5 | 2.1 | 22.5 | Break Down | Excellemt | Good | Good |
| Example 2 | 4.0 | 91.0 | 55.7 | 42.1 | 2.1 | 23.4 | $2.0 \times 10^6$ | Excellemt | Excellemt | Excellemt |
| Example 3 | 4.0 | 91.0 | 55.1 | 41.7 | 2.2 | 24.6 | $6.3 \times 10^6$ | Excellemt | Excellemt | Excellemt |
| Example 4 | 4.0 | 91.0 | 53.9 | 40.8 | 2.2 | 25.5 | $4.6 \times 10^6$ | Excellemt | Excellemt | Excellemt |
| Example 5 | 4.2 | 91.0 | 66.9 | 51.1 | 1.7 | 17.8 | Break Down | Good | Good | Good |
| Example 6 | 4.2 | 91.0 | 64.6 | 49.3 | 1.7 | 19.2 | $4.5 \times 10^6$ | Good | Excellemt | Excellemt |
| Example 7 | 4.2 | 91.0 | 63.5 | 48.3 | 1.8 | 21.1 | $1.0 \times 10^7$ | Good | Excellemt | Excellemt |
| Example 8 | 4.3 | 91.0 | 61.6 | 47.0 | 1.9 | 21.8 | $3.9 \times 10^6$ | Good | Excellemt | Excellemt |
| Example 9 | 4.3 | 90.6 | 65.7 | 50.6 | 1.5 | 17.0 | Break Down | Good | Good | Good |
| Example10 | 4.2 | 90.6 | 64.3 | 49.5 | 1.7 | 18.6 | $2.6 \times 10^6$ | Good | Excellemt | Excellemt |
| Example 11 | 4.3 | 91.2 | 66.1 | 50.6 | 1.8 | 18.7 | Break Down | Good | Good | Good |
| Example 12 | 4.3 | 91.2 | 63.8 | 49.1 | 1.9 | 20.7 | $1.5 \times 10^6$ | Good | Excellemt | Excellemt |
| Comparative Example 1 | 4.9 | 93.0 | 84.1 | 69.7 | 0.5 | 4.3 | Break Down | Good | Excellemt | Fair |
| Comparative Example 2 | 4.8 | 91.0 | 81.9 | 69.1 | 0.7 | 5.6 | $1.5 \times 10^7$ | Poor | Excellemt | Fair |
| Comparative Example 3 | 4.6 | 90.2 | 78.2 | 61.1 | 1.0 | 10.9 | Break Down | Fair | Good | Fair |

As is clear from Tables 1 and 2, in the developers using the carrier core materials of Examples 1 to 4 which contained 27.8% by mass of $CaSiO_3$ and in which the true density was 4.0 g/cm$^3$, the ratio of the number of carriers to which the toner was adhered was less than 0.5%. In the developers using the carrier core materials of Examples 2 to 4 in which the high resistance treatment was performed, no white spots were confirmed both in the initial state and after the printing of one hundred thousand sheets, and satisfactory images were obtained. In the developer using the carrier core material of Example 1 in which the high resistance treatment was not performed, the number of white spots in the image were less than five both in the initial state and after the printing of one hundred thousand sheets, and thus the developer was on a level without any problem in actual use. In Table 2, "B.D." means break down.

In the developers using the carrier core materials of Examples 5 to 8 which contained 19.1% by mass of $CaSiO_3$ and in which the true density was 4.2 g/cm$^3$ or 4.3 g/cm$^3$, the ratio of the number of carriers to which the toner was adhered was satisfactorily less than 1.0%. In the developers using the carrier core materials of Examples 6 to 8 in which the high resistance treatment was performed, no white spots in the image were confirmed both in the initial state and after the printing of one hundred thousand sheets, and thus satisfactory images were obtained. In the developer using the carrier core material of Example 5 in which the high resistance treatment was not performed, the number of white spots in the image were less than five both in the initial state and after the printing of one hundred thousand sheets, and thus the developer was on a level without any problem in actual use.

In the developers using the carrier core materials of Examples 9 to 12 which contained 20.7% by mass of $CaSiO_3$ and in which the true density was 4.2 g/cm$^3$ or 4.3 g/cm$^3$, the ratio of the number of carriers to which the toner was adhered was satisfactorily less than 1.0%. In the developers using the carrier core materials of Examples 10 and 12 in which the high resistance treatment was performed, no white spots in the image were confirmed both in the initial state and after the printing of one hundred thousand sheets, and thus satisfactory images were obtained. In the developers using the carrier core materials of Examples 9 and 11 in which the high resistance treatment was not performed, the number of white spots in the image were less than five both in the initial state and after the printing of one hundred thousand sheets, and thus the developers were on a level without any problem in actual use.

By contrast, in the developers using the carrier core materials of Comparative Examples 1 and 2 which did not contain $CaSiO_3$ and in which the true density was so high as to be 4.9 g/cm$^3$ and 4.8 g/cm$^3$, the particle strength indices were 2.7% by volume and 2.3% by volume so as to be higher than in Examples, and the particle strength was low. Hence, five to ten white spots were generated after the printing of one hundred thousand sheets. In the carrier core material of Comparative Example 2 in which the calcination temperature was so high as to be 1200° C., the apparent density AD was so high as to be 2.42 g/cm$^3$, and the ratio of the number of carriers to which the toner was adhered was equal to or greater than 5.0%, with the result that the carrier core material was on a level which causes a problem in actual use.

In the developer using the carrier core materials of Comparative Example 3 which contained 8.3% by mass of $CaSiO_3$ and in which the true density was so high as to be 4.6 g/cm$^3$, the ratio of the number of carriers to which the toner was adhered was equal to or greater than 1.0% and less than 5.0%, with the result that the carrier core material was on a level which causes a problem in actual use. The particle strength index was 2.2% by volume so as to be higher than in Examples, and the particle strength was low. Hence, five to ten white spots were generated after the printing of one hundred thousand sheets.

INDUSTRIAL APPLICABILITY

According to the carrier core material of the present invention, toner spent is suppressed, and thus the carrier core material is unlikely to crack or chip even in long-term use.

The invention claimed is:

1. A carrier core material formed of ferrite particles, the carrier core material comprising:

$CaSiO_3$, wherein a content of $CaSiO_3$ in the ferrite particles is equal to or greater than 10% by mass and equal to or less than 50% by mass, and wherein a true density of the carrier core material is equal to or greater than 3.5 g/cm$^3$ and equal to or less than 4.5 g/cm$^3$.

2. The carrier core material according to claim 1, wherein a particle strength index calculated from a formula (1) below is equal to or less than 1.5% by volume:

$$\text{particle strength index} = V2 - V1 \tag{1}$$

wherein in the formula, V1 is a cumulative value (% by volume) with a particle diameter of 22 μm or less in a total particle size distribution of the carrier core material before a crush test, and V2 is a cumulative value (% by volume) with a particle diameter of 22 μm or less in a total particle size distribution of the carrier core material after the crush test, and conditions of the crush test are that 30 g of the carrier core material is crushed using a sample mill at a rotation speed of 14000 rpm for 60 seconds.

3. The carrier core material according to claim 1, wherein an apparent density of the ferrite particles is equal to or greater than 1.7 g/cm$^3$ and equal to or less than 2.1 g/cm$^3$.

4. The carrier core material according to claim 1, wherein saturation magnetization of the ferrite particles is equal to or greater than 40 Am$^2$/kg and equal to or less than 72 Am$^2$/kg.

5. The carrier core material according to claim 1, wherein residual magnetization of the ferrite particles is equal to or less than 2.5 Am$^2$/kg, and a coercive force thereof is equal to or less than 30 oersteds.

6. The carrier core material according to claim 1, wherein the ferrite particles include a material represented by a composition formula $(Mn_xFe_{3-x})O_4$, wherein where $0 \leq X < 3$, a content of Ca is equal to or greater than 3.4% by mass and equal to or less than 15.8% by mass and a content of Si is equal to or greater than 3.0% by mass and equal to or less than 11.4% by mass.

7. An electrophotographic development carrier, wherein a surface of the carrier core material according to claim 1 is coated with a resin.

8. An electrophotographic developer comprising:

the electrophotographic development carrier according to claim 7; and a toner.

* * * * *